US010127607B2

(12) United States Patent
Gupta et al.

(10) Patent No.: US 10,127,607 B2
(45) Date of Patent: Nov. 13, 2018

(54) ALERT NOTIFICATION

(71) Applicant: Wal-Mart Stores, Inc., Bentonville, AR (US)

(72) Inventors: Ankit Gupta, Bangalore (IN); Saurav Shah, Bangalore (IN); Venkata Pranay Kumar Sowdaboina, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 864 days.

(21) Appl. No.: 14/553,663

(22) Filed: Nov. 25, 2014

(65) Prior Publication Data

US 2016/0148147 A1 May 26, 2016

(51) Int. Cl.
G06Q 30/00 (2012.01)
G06Q 30/06 (2012.01)
G06Q 10/06 (2012.01)
G06Q 10/08 (2012.01)
G06Q 20/20 (2012.01)
G06Q 30/02 (2012.01)

(52) U.S. Cl.
CPC . *G06Q 30/0643* (2013.01); *G06Q 10/063114* (2013.01); *G06Q 10/087* (2013.01); *G06Q 20/20* (2013.01); *G06Q 30/0254* (2013.01)

(58) Field of Classification Search
None
See application file for complete search history.

(56) References Cited

U.S. PATENT DOCUMENTS

| 8,774,504 | B1* | 7/2014 | Sundareswara .... | G06K 9/00201 382/165 |
| 9,589,433 | B1* | 3/2017 | Thramann ........ | G08B 13/19613 |
| 9,679,332 | B2* | 6/2017 | Kim ................... | G06Q 30/0643 |
| 2009/0240735 | A1* | 9/2009 | Grandhi ................ | G06Q 30/02 |
| 2011/0078055 | A1* | 3/2011 | Faribault ............... | G06Q 30/02 705/27.2 |
| 2013/0110678 | A1* | 5/2013 | Vigier ................... | G06Q 30/06 705/26.61 |
| 2014/0244447 | A1* | 8/2014 | Kim ................... | G06Q 30/0643 705/27.2 |

* cited by examiner

*Primary Examiner* — Gurkanwaljit Singh
(74) *Attorney, Agent, or Firm* — Bryan Cave Leighton Paisner LLP

(57) ABSTRACT

A system for alerting an employee or agent of a retailer regarding an unfavorable condition may include the use of computer-aided visual recognition of products to aid in identifying the location of the unfavorable condition. A user can direct a mobile computing device camera at one or more targeted products displayed on store shelves. Image recognition operations can be carried out to compare the targeted product image(s) against images from a prepopulated product image store of known products. Upon a positive match, shelf location information of the identified targeted product (s) may be used to determine the current location of the user. The employee or agent may be alerted with respect to the unfavorable condition and the location thereof.

21 Claims, 4 Drawing Sheets

ALERT NOTIFICATION

BACKGROUND

In recent years, mobile computing devices have become ubiquitous around the world in many societies. Worldwide, hundreds of millions of mobile computing devices are sold every year. Such devices may be used frequently throughout each day, and thus may be carried by users at nearly all times. Such mobile computing devices include, but are not limited to: smartphones, tablets, e-readers, wearable computing devices such as smart glasses and smartwatches, and other types of mobile electronic computing devices.

Retail establishments typically have an objective of maintaining their premises clean, tranquil, and well-stocked with products in order to maintain a perception of high quality and good service with customers and/or visitors. Empty shelves, unclean floors, and/or security incidents at retail establishments or other commercial facilities may create unsanitary and/or hazardous conditions to customers, employees, or visitors. Thus, retail establishments may aim to minimize such unfavorable conditions.

However, because of the size of some retail stores, the number of aisles found in them, and the number of employees typically on staff at any particular moment, store employees may not notice unfavorable conditions within an optimal timeframe, potentially causing the conditions to remain longer than would be satisfactory. The perceptions of customers or visitors with respect to a retailer may be negatively affected by observing empty shelves, unclean floors, and/or security incidents, and accordingly, any delay between creation of such conditions and corrective action may be undesirable to a retail or commercial establishment.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
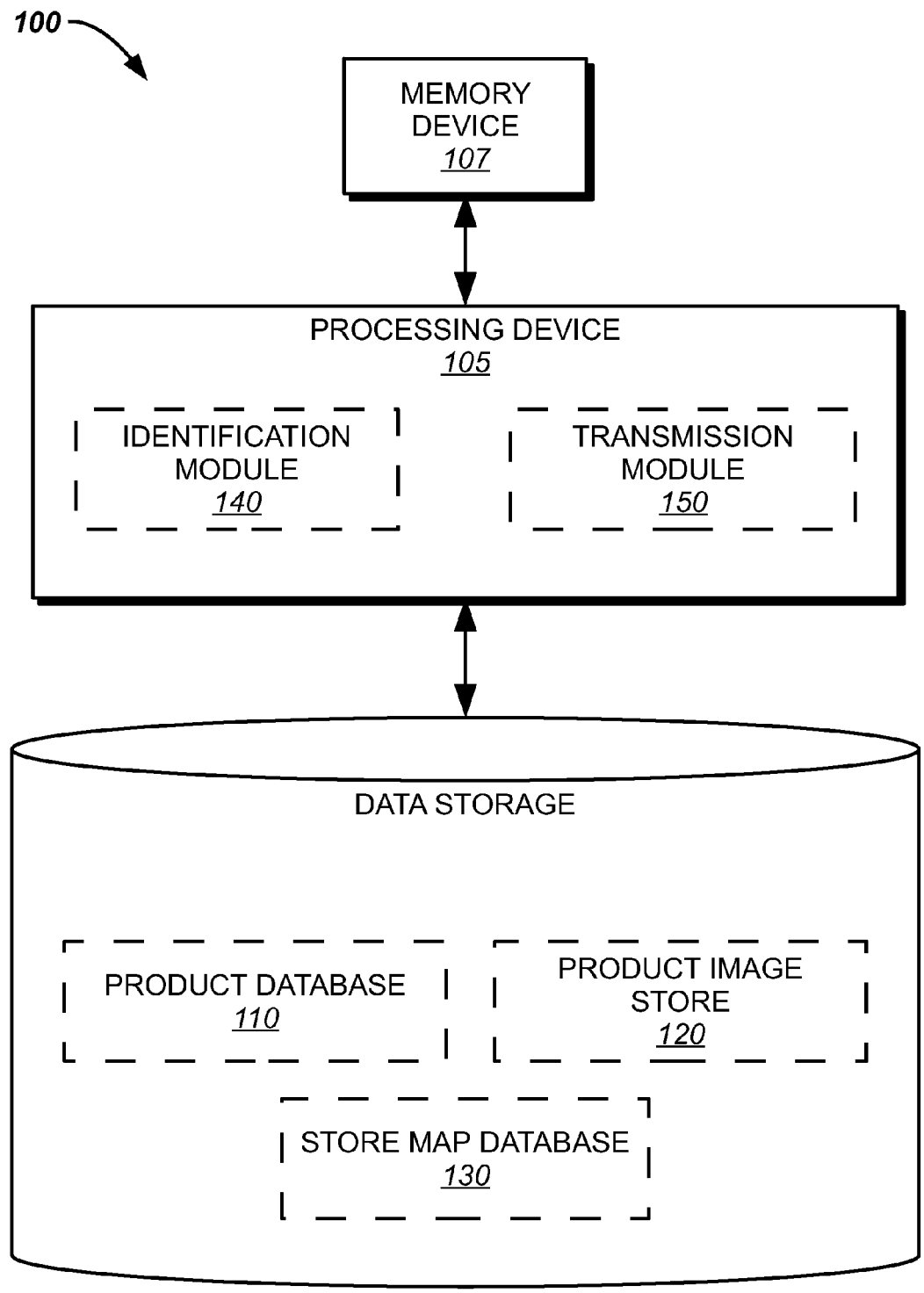
FIG. 1 is a block diagram illustrating a notification server according to one embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for notifying employees or other staff of unfavorable conditions. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

According to various embodiments of the present disclosure, notifying employees, agents, or other staff with respect to an unfavorable condition may be carried out in a crowd-sourced manner by taking advantage of customers, visitors, employees, or other people at a facility that are using mobile computing devices. As used herein, the term "unfavorable condition" includes, but is not limited to, spills, disruptive and/or disorderly people, shoplifting or other criminal activity, depleted product stock (i.e., empty shelves), or other undesirable actions or circumstances for which prompt corrective action may be desirable. Whether any particular condition qualifies as "unfavorable" may be a subjective determination to be made according to a person witnessing the condition, and may thus be defined as such as perceived by the individual.

According to embodiments, a customer, visitor, or other person who witnesses an unfavorable condition can discreetly alert a store manager, employee, security officer, or other agent via a software application on a mobile computing device. In various embodiments, the alert includes the location where the condition was observed. Embodiments of the present disclosure may rely upon image recognition techniques to determine the current position of the mobile computing device and/or the person witnessing the unfavorable condition. In particular, one embodiment of the present disclosure is directed to computer-implemented image recognition of retail products on shelves, displays, or the like within a retail store to determine a current location of the mobile computing device.

According to embodiments, image recognition of a retail product may be carried out when products, or packaging thereof, are in a field of view of a mobile computing device camera. Such products may be identified using computer image recognition techniques. In various embodiments, a map of locations of the products within the retail store may be recalled and consulted to determine a current location based on product images captured by the mobile computing device. Upon determining a current location within the store, an alert may be transmitted to an appropriate staff, agent, or employee for to respond. The alert can include a notification of the location of the condition. Upon being alerted, an agent or employee of the retail or commercial establishment may then go to the location or otherwise take corrective steps to treat the unfavorable condition. For example, a stocking employee may be alerted of depleted product stock at an indicated shelf location and requested to re-stock that product, a security guard may be alerted of a disturbance at a particular store department and requested to deal with the disturbance, or a janitorial employee may be alerted of a spill at a particular location and be requested to clean it.

FIG. 1 is a block diagram depicting a notification server 100 according to one embodiment of the present disclosure. In the illustrated embodiment, notification server 100 includes a product database 110, product image store 120, and store map database 130. In an embodiment, notification server 100 includes a processing device 105 and computer-readable instructions configured to include an identification module 140 and a transmission module 150.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

According to an embodiment, product database 110 includes memory containing the identities of various products. Such products may include products offered for sale in a retail store associated with notification server 100.

According to an embodiment, product image store 120 includes memory containing numerous prepopulated images of products. In one example embodiment, product image store 120 includes at least four or five images for each product. In other embodiments, other quantities of images for each product are stored at product image store 120. Such images may include images showing multiple perspectives of each product and/or product packaging. For example, a product may have multiple images stored at product image store 120, each image respectively depicting the front, back, sides, top, and bottom of the product or packaging. In one embodiment, product image store 120 includes an association between each product image and the corresponding product in product database 110. In an embodiment, product image store 120 may be continually supplemented with new images of the products.

In an embodiment, store map database 130 includes memory containing data related to the physical location of each product within the retail store. In particular embodiments, store map database 130 stores physical coordinates of each product. In one embodiment, such physical coordinates include a vertical coordinate, which may correspond to a shelf height where each product is displayed. In embodiments, store map database 130 includes memory containing an aisle number, a bay number, a display number, a shelf number, combinations of the foregoing, or other indicia of in-store locations for each product. In an embodiment, store map database 130 is adapted to be queried with a retail product and return the physical location of the product within the store.

In one embodiment, processing device 105 is adapted to communicate with product database 110 and product image store 120 and receive one or more signals from a mobile computing device. Embodiments of notification server 100 include a memory device 107 storing computer readable instructions and one or more processors adapted to execute the computer readable instructions.

According to embodiments, identification module 140 is operable to receive one or more signals from a mobile computing device operated by a user who has witnessed an unfavorable condition. Such signals generated by the mobile computing device may include a product image captured by a camera on the mobile computing device. In one embodiment, an image is received at identification module 140 and compared to images in product image store 120 to find a match between the images. When a match has been found and the product(s) identified, data related to the identified product(s) can be recalled from store map database 130 to determine the in-store location of the identified product(s).

Identification module 140 can direct transmission module 150 to transmit all or some of the information gathered about the identified location to an employee or agent to treat the unfavorable condition. In an embodiment, transmission module 150 can additionally transmit one or more images of the unfavorable condition, as captured by the witness's mobile computing device, to the employee or agent to further assist in prompting appropriate corrective action. In one embodiment, the employee or agent is provided with navigation directions to walk to the location of the condition.

Embodiments of the present disclosure may be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Figure 2:
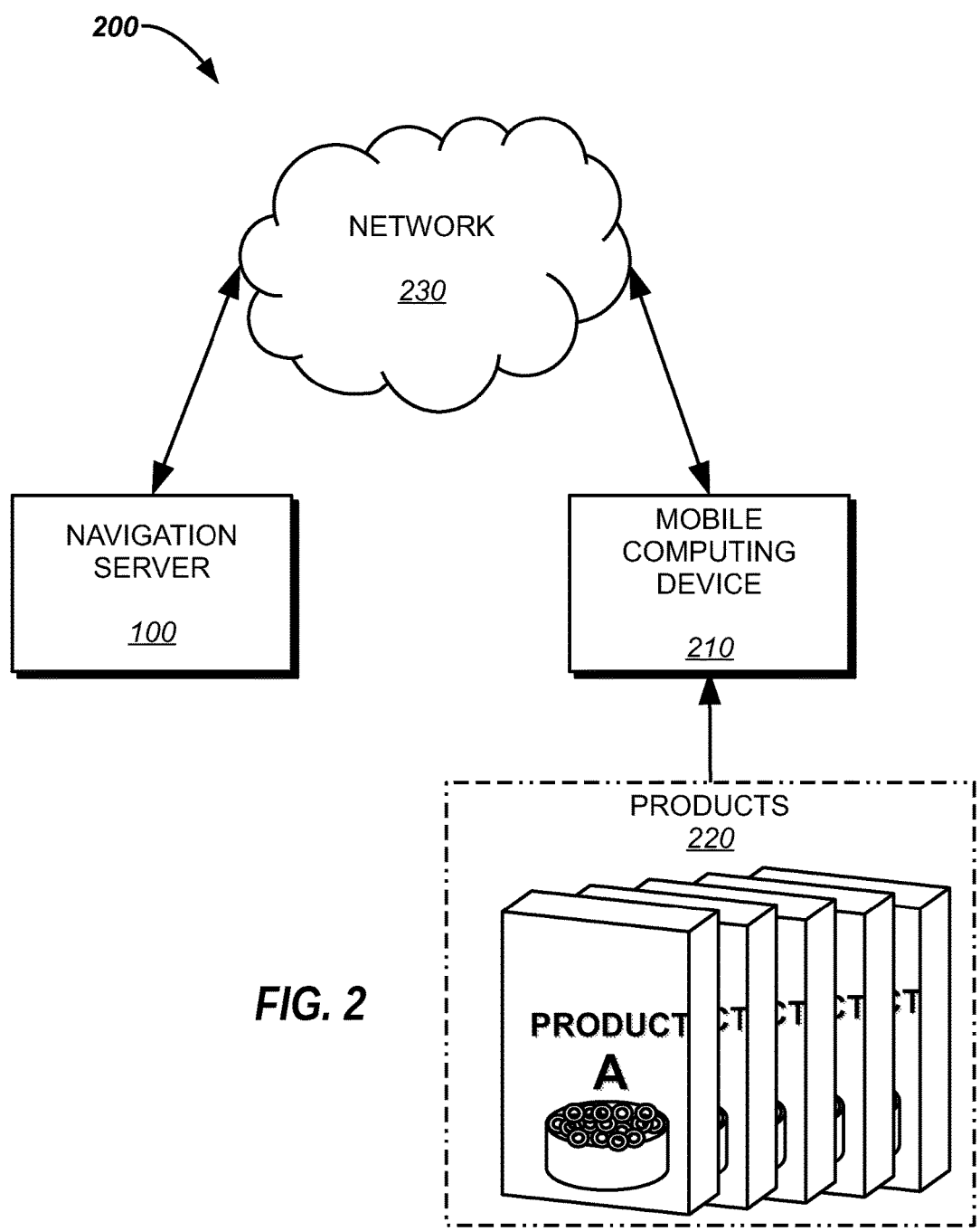
FIG. 2 is a schematic illustration of a staff notification system according to an embodiment of the present disclosure.

FIG. 2 is an example schematic illustration of a staff notification system 200 according to embodiments of the present disclosure. Staff notification system 200 can carry out a computer-implemented method that includes identifying one or more products depicted in images that were captured by a user that had witnessed an unfavorable condition, thereby determining the current location where said images were captured, and providing an alert to a staff member to treat the unfavorable condition.

In an embodiment, a mobile computing device 210 can be possessed, worn, and/or used by a user to capture an image of one or more targeted products 220. In various embodiments, mobile computing device 210 comprises a smartphone, a tablet, an e-reader, a wearable computing device such as smart glasses or smartwatches, or any other mobile computing device operable to receive and/or transmit data, or any other electronic computing device operable to receive and/or transmit data, such as video data, audio data, and other forms of data.

The signals transmitted from mobile computing device 210 and received by notification server 100 can be transmitted through a network 230. As used herein, the term "network" may include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

In response to the signals received from mobile computing device 210, notification server 100 can identify one or more targeted products 220 that are depicted in the image captured by the mobile computing device 210 by applying various computer image recognition techniques and comparing the image of targeted products 220 to product images at product image store 120.

After identifying one or more products, notification server 100 can recall information associated with the product. This information may be stored in product database 110 and made accessible to processing device 105. According to an embodiment, product database 110 includes memory containing the identities of various products. Such products may include products offered for sale in a retail store associated with staff notification system 200. After obtaining the information, notification server 100 can query store map database 130 with the product identifier to determine the in-store location where the image was captured.

Figure 3:
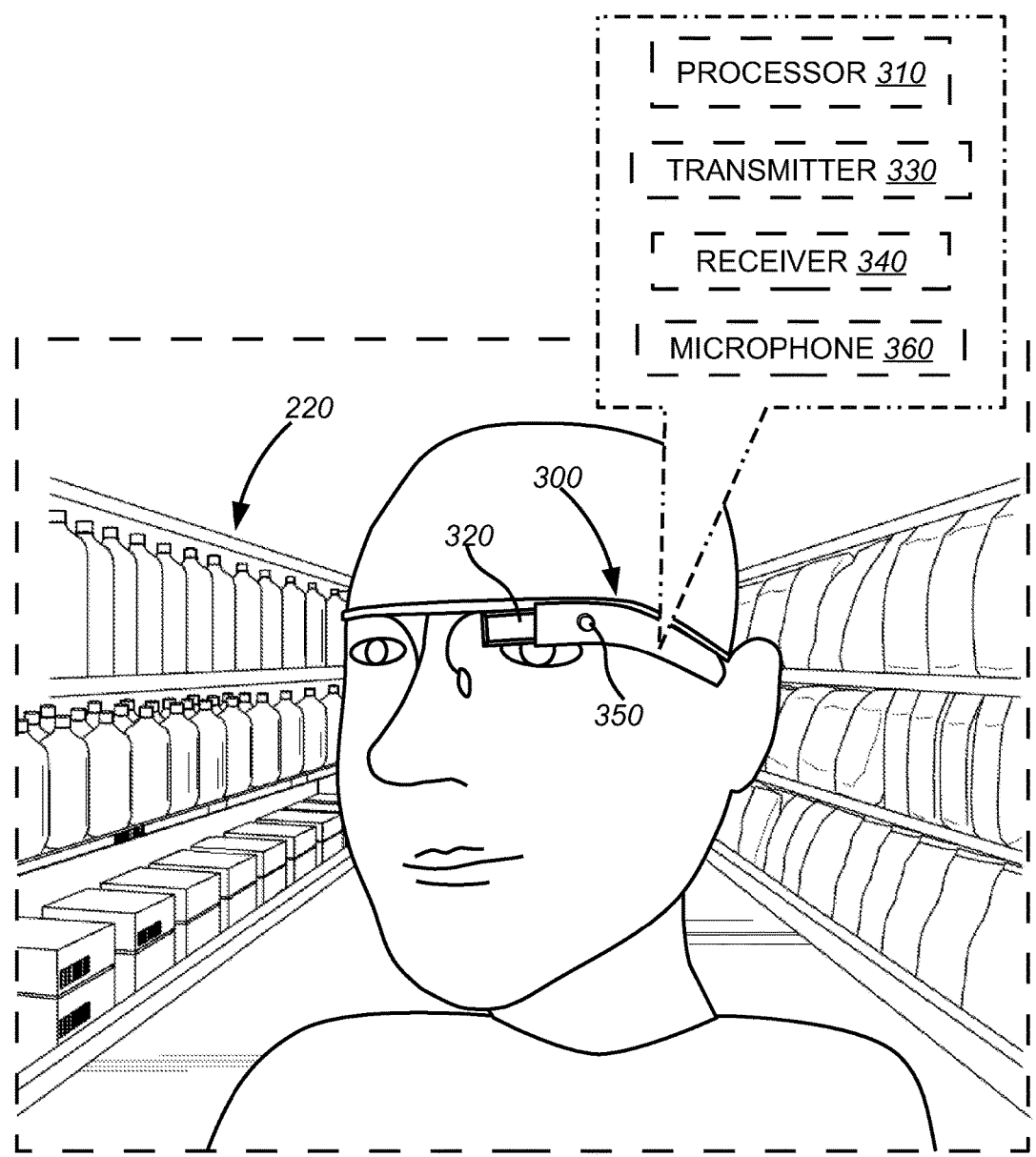
FIG. 3 is an illustration of a use of a smart glasses mobile computing device in accordance with embodiments of the present disclosure.

FIG. 3 is an example illustration of a mobile computing device 300 applied according to embodiments of the present disclosure. As depicted, one embodiment of mobile computing device 300 comprises smart glasses. In alternative embodiments, mobile computing device 300 comprises other types of mobile electronic computing devices. An embodiment of mobile computing device 300 comprises a processor 310, a display 320, a transmitter 330, a receiver 340, a camera 350, and a microphone 360. In the embodiment depicted in FIG. 3, display 320 comprises a head mounted display.

In one embodiment, processor 310 is operable to receive images captured by camera 350, as directed by the user. Processor 310 can also be operable to control the other components 320, 330, 340, 350 of mobile computing device 300. Processor 310 can also be operable to process signals received by the mobile computing device 300. While a single processor 310 is illustrated, it should be appreciated that the term "processor" can include two or more processors that operate in an individual or distributed manner.

Display 320 may be positioned to project an image within the user's field of view. While camera 350 is directed at a targeted product 220, video or still images captured by camera 350 can be shown to the consumer on display 320. Display 320 can be configured to display text, graphics, images, illustrations, user interface objects, and/or any other video signals to the user.

In an embodiment, transmitter 330 is configured to transmit signals generated by components 310, 320, 350, or 360 to notification server 100. Processor 310 can direct signals from mobile computing device 300 to notification server 100 via transmitter 330. In an embodiment, transmitter 330 comprises an electrical communication element within processor 310. In one embodiment, processor 310 is operable to direct signals to transmitter 330 and transmitter 330 is operable to transmit the signals from mobile computing device 300 to, for example, notification server 100 via network 230.

In an embodiment, receiver 340 is configured to receive signals and to direct signals that have been received to processor 310 for further processing and/or recording. Receiver 340 may be operable to receive transmissions via network 230 and subsequently communicate the transmissions to processor 310. In various embodiments, receiver 340 comprises an electrical communication element within processor 310. In some embodiments of the present disclosure, receiver 340 and transmitter 330 comprises an integral component.

Transmitter 330 and receiver 340 are adapted to communicate over a Wi-Fi network, allowing mobile computing device 300 to exchange data wirelessly (using radio waves or the like) over a computer network, including high-speed Internet connections. Transmitter 330 and receiver 340 may also apply Bluetooth® standards for exchanging data by using short-wavelength radio transmissions, thereby creating a personal area network (PAN). In an embodiment, transmitter 330 and receiver 340 also apply 3G and/or 4G as defined by the International Mobile Telecommunications-2000 (IMT-2000) specifications promulgated by the International Telecommunication Union.

One embodiment of mobile computing device 300 comprises one or more microphones 360. Microphone 360 is adapted to convert sounds to electrical signals and transmit said signals to processor 310 and/or a speech recognition system. One embodiment of the present disclosure comprises a speech recognition system on mobile computing device 300. Another embodiment comprises a speech recognition system at a remote server. In embodiments, microphone 360 can receive verbal commands from the user. Said verbal commands can be interpreted and translated to user inputs.

An embodiment of mobile computing device 300 comprises one or more speakers. Each speaker can be configured to emit sounds, messages, information, and any other audio signal to the consumer. Speaker can be positioned within the consumer's range of hearing while using mobile computing device 300. Audio content transmitted from notification server 100 can be played for the consumer through the speaker. Receiver 340 can receive an audio signal from notification server 100 and direct the audio signal to processor 310. Processor 310 may then control the speaker to emit the audio content.

Figure 4:
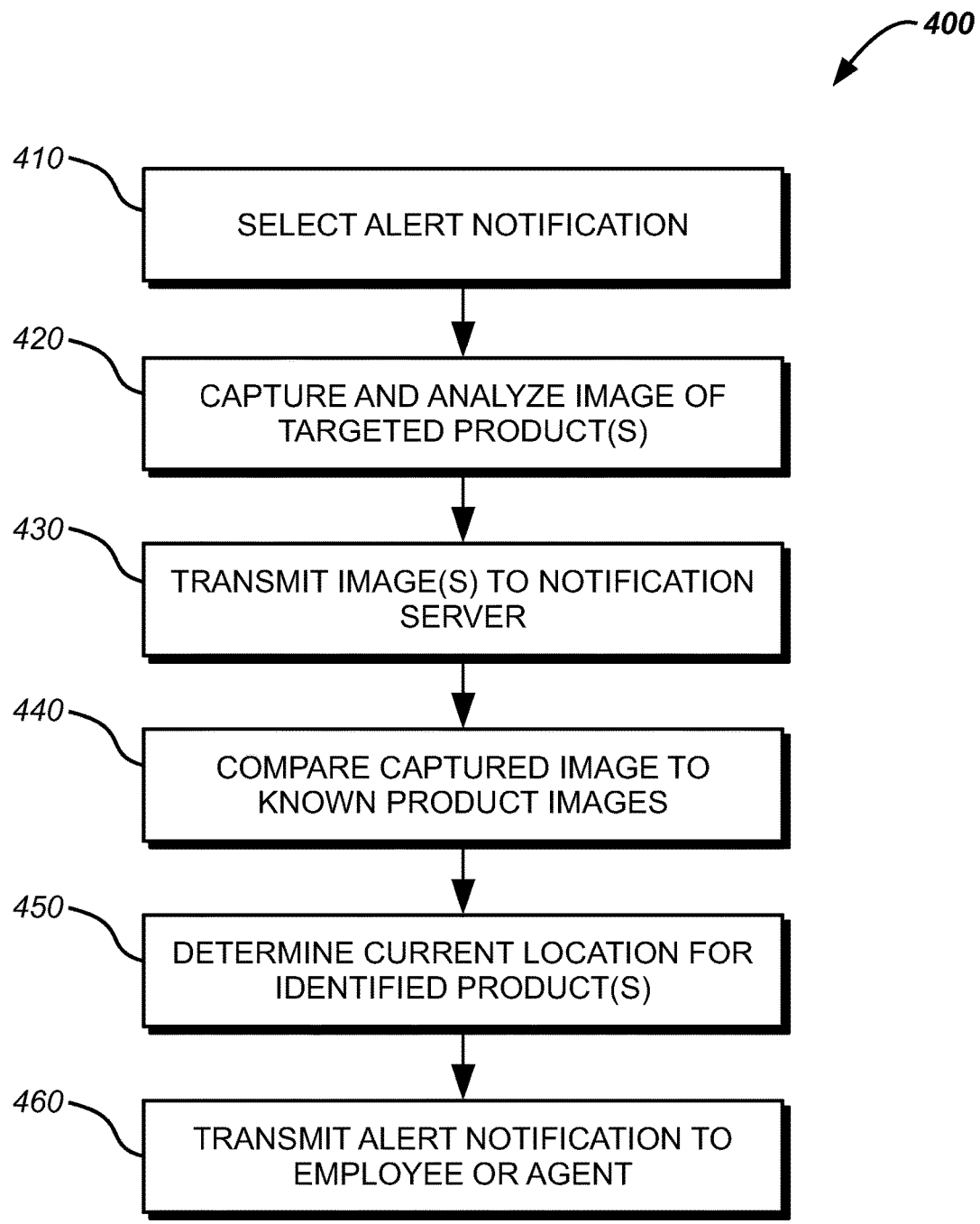
FIG. 4 is a flow chart illustration of a method of notifying staff of an unfavorable condition according to one embodiment of the present disclosure.

In operation, staff notification system 200 may alert an employee or agent of an unfavorable condition that was witnessed and reported by a user on a mobile computing device. According to an embodiment, the alert may include the user's current location within a retail store. Embodiments of the present disclosure can determine the current location by capturing images of products on store shelves with a camera of the mobile computing device and then identifying the products by utilizing computer image recognition techniques. According to one embodiment, the known shelf location of the identified products, once determined, can be presumed to be the in-store current location of the user. Referring now to FIG. 4, a method 400 for notifying employees or other staff of unfavorable conditions is depicted.

Method 400 begins at operation 410, when a use in a retail store observes unfavorable conditions that lead the user to the conclusion that an employee or agent of the retailer should be notified. In one embodiment, a user interface produced on a display of the user's mobile computing device has an object labeled "Report." The user may create an alert by selecting the "Report" object. In another embodiment, a user may create an alert by using voice commands, for example by saying "Report" into a microphone of the mobile computing device. In some cases, the user may desire to create an alert only if doing so could be done discreetly. Accordingly, embodiments of the present disclosure include multiple ways to create an alarm.

At operation 420, the user's mobile computing device captures one or more images of targeted products within a store via a camera on the mobile computing device. In an embodiment, the images may include the unfavorable condition that the user witnessed. In embodiments, images of target products are captured continuously as a background process of the mobile computing device and thus the user's location may be tracked before and after the user created the alert.

In some embodiments, the mobile computing device comprises smart glasses. In such cases, the camera of the smart glasses may capture essentially all images as seen by the user. In other words, as the user faces one or more products on the shelves while wearing the smart glasses, the camera may capture images of the products. In other embodiments, the user may manually aim the camera of any type of mobile computing device at various products on the shelves. Images captured by the camera may include various products. Such products may be referred to herein as "targeted products."

According to an embodiment, the mobile computing device can repeatedly capture and analyze images to determine the identity of targeted products. In one embodiment, the captured images are transmitted from the camera to the processor of the mobile computing device for analysis and product recognition. In other embodiments, the captured images are transmitted to a notification server. In alternative embodiments, preliminary processing on captured images is carried out by the processor of the mobile computing device, after which selected one or more images and the results of said preliminary processing are transmitted to a notification server for product recognition.

According to embodiments, multiple image frames are captured by the camera of a mobile computing device. In one embodiment, the mobile computing device may continually capture images. In one embodiment, each captured frame is analyzed. In another embodiment, selected frames are analyzed.

According to an embodiment, at operation 420, preliminary processing that is carried out by the processor of the mobile computing device comprises detection of features in each of the one or more selected captured images. In one embodiment, a feature detection algorithm known as SURF (Speeded-Up Robust Features) is carried out by the processor of the mobile computing device to detect features in the one or more images. In other embodiments, other feature detection algorithms are carried out to detect features in the one or more images using a feature detection algorithm that is known in the art or yet to be known. In an embodiment, feature detection operations are performed on multiple images captured sequentially from the camera on the mobile computing device.

Upon completing the preliminary analysis, a selection of one or more images exhibiting a threshold number of detected features may be made from the multiple captured images to transmit to a notification server for further analysis and product matching. In another embodiment, additional analysis is carried out to make a selection of one or more images to transmit to the notification server.

At operation 430, one or more selected images of targeted products are transferred to a notification server. As described herein, the transmission may take place over any one of a variety of network types or combinations thereof.

At operation 440, the transmitted images are received at a notification server and compared to images at a product image store for matches. According to embodiments of the present disclosure, the notification server is adapted to compensate for image rotation and scaling differences between captured images and images at the product image store. In one embodiment of operation 440, a match score is determined between an image captured by the camera and an image at the product image store. After carrying out image comparison operations between the received image and the images at the product image store, the highest match score may determine the closest match.

In one embodiment, a minimum score threshold is instituted so that if no match score exceeds the threshold, it may be presumed that the image captured by the mobile computing device does not depict a product that the retailer offers. In one embodiment, machine learning techniques are carried out with respect to the minimum score threshold by inputting multiple known matching image pairs and thus building a model to determine whether image pairs are similar enough to constitute a match.

In one embodiment of operation 440, a notification server is adapted to identify multiple targeted products in each image or image frame captured by the mobile computing device. Each image may be split into multiple constituent images, with each constituent image depicting a targeted product captured by the camera.

It is an objective of some embodiments of the present disclosure to prevent false positive identifications of products that are presumably at their proper location on the store shelves, but have actually been moved. For example, if a user directs a camera at a shopping cart that contains one or more targeted products, images of the targeted products may be transmitted to a notification server for matching. Assuming that the cart has been moved a significant distance from the original shelf location of the targeted products, a positive match between the targeted products in the cart and images at a product image store may lead to an incorrect conclusion regarding the current location since the targeted products were not actually at their assigned location on a shelf. Thus, it may be preferable to ignore products that are in a shopping cart or otherwise not on the shelves. Accordingly, embodiments of the present disclosure may employee several qualification techniques to ensure the integrity of a staff notification system and prevent false identification of products not on the store shelves.

In one embodiment of the present disclosure, a qualification technique incorporates the assumption that if multiples of the same product are in an image, then those products are together on a shelf. This technique operates on the assumption that shoppers are less likely to purchase multiples of the same product at the same time and it further operates on the fact that the same products are found next to each other on the store shelf. Thus, if a captured image depicts multiple quantities of a single product, it may be presumed that those products are on the shelf and that the known shelf location, as stored at a store map database, may be used as the current location where the image was captured.

Likewise, in one embodiment of the present disclosure, if a captured image depicts multiple products, each one comprising products in a shared category (for example interchangeable products from different brands), which have a low probability of being purchased together but may be found next to each other on the store shelf, it may be presumed that those products are at their assigned shelf location.

Conversely, in one embodiment, if a captured image depicts multiple different products in close proximity to each other, it may be presumed that those products are not at their proper shelf location but rather in a cart, and may thus be disregarded.

In another embodiment of the present disclosure, the user may be requested by the mobile computing device to direct the camera at a store shelf so that an image of targeted products placed there may be captured and transmitted to a notification server for comparison to photos from a product image store.

As would be understood by a person of ordinary skill in the art having the benefit of the present disclosure, images captured by a camera on a mobile computing device may comprise a relatively low resolution in comparison to images generated by a dedicated camera. Thus, lower thresholds may be instituted in the matching algorithm in order to compensate for anticipated low resolution images received from mobile computing devices.

In one embodiment of operation 440, recognition and analysis of text, product codes (such as UPC/bar codes), and other information on targeted products or packaging may be used to assist product matching. For example, the name of a product may appear as text on the product packaging. An image of the packaging may depict the product name. By recognizing and extracting such text from the image, the result of the matching operation 440 may be validated.

In one embodiment, a result of operation 440 is that a product has been matched to an image of a targeted product captured by a camera of a user's mobile computing device. In some embodiments, multiple products are identified from images. If so desired, a notification server may be enabled to identify any number of products depicted in captured images. In some embodiments, multiple products are potentially selected from each image frame captured by the camera.

In one embodiment, a notification server may receive multiple images or image frames (i.e., from a video feed), each image or image frame depicting one or more products. In one embodiment, a notification server may be configured to only confirm a product match after identifying the targeted product in a minimum quantity of consecutive images or frames, as captured by the camera of a mobile computing device. In this manner, the notification server may minimize false positive identifications of products.

At operation 450, a notification server queries a product image store for location information related to the one or more identified targeted products. In one embodiment, such information may include an aisle number, a bay number, a display number, a shelf number, location coordinates, combinations of the foregoing, or other indicia of in-store locations. According to embodiments, the location of identified targeted products may be presumed to be the current location where the image was captured and where the unfavorable condition remains.

In one embodiment of the present disclosure, a form of dead reckoning may be additionally employed to determine a user's current location. In particular, a staff notification system may continually track the user's movement beginning upon entrance into the store. In embodiments, certain assumptions may be utilized, such as a maximum walking velocity, to validate a current location determination. Additionally, embodiments of the mobile computing device comprise a compass, accelerometers, and other sensors that may register movement and/or orientation of the mobile computing device. Data generated by such sensors may also be used to validate a current location determination.

At operation 460, a notification server notifies an employee or agent of the unfavorable condition which precipitated the alert. In an embodiment, when transmitting information regarding the condition to the employee or agent, the notification server may include the location where the user was when the alarm was initially triggered. The notification server may additionally transmit one or more images of the condition, captured by the user's mobile computing device camera, to help the employee or agent determine an appropriate response. In one embodiment, the alert is selectively transmitted to an appropriate employee or agent depending on the type of unfavorable condition. For example, criminal activity may trigger an alert being transmitted to a security guard. According to embodiments of the present disclosure, the recipient of the alert may be requested or assigned to carry out corrective remedies.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A computer-implemented method for generating an alert regarding an unfavorable condition, comprising:
   receiving, at a processing device of a notification computer server, a first alert signal transmitted from an application ("app") downloaded on a mobile computing device of a user, wherein the first alert signal comprises a first in-store location of a current position of the mobile computing device in a retail store;
   receiving, at the processing device, one or more signals from the app on the mobile computing device of the user corresponding to one or more images of a targeted product, wherein the targeted product corresponds to a second in-store location in the retail store where the unfavorable condition was observed;
   determining, at the processing device, whether the one or more images of the targeted product matches at least one image stored at a product image store;
   when the one or more images of the targeted product matches the at least one image stored at the product image store, recalling, from a store map database, information regarding the second in-store location of the targeted product, wherein the information comprises physical coordinates of the targeted product at a particular shelf or display at the second in-store location in the retail store;
   defining a condition location based on the first in-store location and the second in-store location of the targeted product; and
   transmitting, from the processing device, a second alert signal to a computing device of an agent of the retail store, the second alert signal including the condition location.

2. The method of claim 1, wherein the information regarding the second in-store location is selected from the group consisting of: an aisle number, a bay number, a display number, a shelf number, a location coordinate, and combinations thereof.

3. The method claim 1, wherein determining, at the processing device, whether the one or more images of the targeted product matches the at least one image stored at the product image store comprises:
   comparing, at the processing device, the one or more images of the targeted product to the at least one image stored at the product image store, thereby resulting in a comparison score; and
   determining, at the processing device, when the comparison score meets or exceeds a minimum score threshold, thereby resulting in a determination that the one or more images of the targeted product matches the at least one image.

4. The method of claim 3, wherein the unfavorable condition is selected from the group consisting of a criminal act, a spill, and a depleted product stock.

5. The method of claim 1, wherein the first alert signal was triggered by observation of the unfavorable condition by the user initiating the app on the mobile computing device of the user.

6. The method of claim 1, wherein determining, at the processing device, whether the one or more images of the targeted product matches the at least one image stored at the product image store further comprises applying a feature detection algorithm to the one or more images of the targeted product.

7. The method of claim 6, wherein applying the feature detection algorithm to the one or more images of the targeted product comprises carrying out a Speeded-Up Robust Features (SURF) feature detection algorithm.

8. The method of claim 1, wherein determining, at the processing device, whether the one or more images of the targeted product matches the at least one image stored at the product image store further comprises:
   splitting the one or more images of the targeted product into multiple constituent images; and
   comparing each of the multiple constituent images to the at least one image stored at the product image store.

9. The method of claim 1, wherein:
   receiving, at the processing device of the notification computer server, the first alert signal further comprises receiving an image depicting the unfavorable condition from the app on the mobile computing device of the user; and
   transmitting, from the processing device, the second alert signal to the computing device of the agent of the retail store further comprises transmitting the image depicting the unfavorable condition.

10. A method for generating an alert regarding an unfavorable condition, comprising;
    receiving, at a processing device, a targeted product image from an application ("app") downloaded on a mobile computing device of a user, wherein the targeted product image comprises a first in-store location on a current position of the mobile computing device;
    when the targeted product image matches a known product image, recalling, from a store map database, information regarding a second in-store location corresponding to the known product image, wherein the information comprises physical coordinates of a targeted product at a particular shelf or display;
    defining a condition location based on the first in-store location and the second in-store location; and
    transmitting, from the processing device, an alert signal to an agent, the alert signal including the condition location.

11. A computer-implemented system for generating an alert regarding an unfavorable condition comprising:
    a notification computer server comprising one or more non-transitory memory devices and a processing device, the one or more non-transitory memory devices storing computer-readable instructions directing the processing device to:
       receive a first alert signal transmitted from an application ("app") downloaded on a mobile computing device of a user, wherein the first alert signal comprises a first in-store location of a current position of the mobile computing device in a retail store;
       receive one or more signals from the app on the mobile computing device of the user corresponding to one or more images of a targeted product, wherein the targeted product corresponds to a second in-store location in the retail store where the unfavorable condition was observed;
       determine whether the one or more images of the targeted product matches at least one image stored at a product image store;

when the one or more images of the targeted product matches the at least one image stored at the product image store, recalling, from a store map database, information regarding the second in-store location of the targeted product, wherein the information comprises physical coordinates of the targeted product at a particular shelf or display at the second in-store location in the retail store;

define a condition location based on the first in-store location and the second in-store location of the targeted product; and transmit a second alert signal to a computing device of an agent of the retail store, the second alert signal including the condition location.

12. The system of claim 11, wherein the information regarding the second in-store location is selected from the group consisting of: an aisle number, a bay number, a display number, a shelf number, a location coordinate, and combinations thereof.

13. The system of claim 11, wherein the computer-readable instructions further direct the processing device to:

compare the one or more images of the targeted product to the at least one image stored at the product image store, thereby resulting in a comparison score; and determine when the comparison score meets or exceeds a minimum score threshold, thereby resulting in a determination that the one or more images of the targeted product matches the at least one image.

14. The system of claim 13, wherein the unfavorable condition is selected from the group consisting of a criminal act, a spill, and a depleted product stock.

15. The system of claim 11, wherein the first alert signal was triggered by observation of the unfavorable condition by the user initiating the app on the mobile computing device of the user.

16. The system of claim 11, wherein the computer-readable instructions further direct the processing device to apply a feature detection algorithm to the one or more images of the targeted product.

17. The system of claim 16 wherein the computer-readable instructions further direct the processing device to carry out a Speeded-Up Robust Features (SURF) feature detection algorithm.

18. The system of claim 11, wherein the computer-readable instructions further direct the processing device to:

split the one or more images of the targeted product into multiple constituent images and compare each of the multiple constituent images to the at least one image stored at the product image store.

19. The system of claim 11, wherein the computer-readable instructions further direct the processing device to receive the first alert signal further comprises receiving an image depicting the unfavorable condition from the app on the mobile computing device of the user; and transmit the second alert signal to the computing device of the agent of the retail store further comprises transmitting the image depicting the unfavorable condition.

20. The method of claim 1, wherein the information further comprises vertical coordinates and horizontal coordinates of the targeted product corresponding to a shelf height or a display height.

21. The system of claim 11, wherein the information further comprises vertical coordinates and horizontal coordinates of the targeted product corresponding to a shelf height or a display height.

* * * * *